(12) United States Patent
Gao

(10) Patent No.: US 11,829,479 B2
(45) Date of Patent: Nov. 28, 2023

(54) FIRMWARE SECURITY VERIFICATION METHOD AND DEVICE

(71) Applicant: INNOGRIT TECHNOLOGIES CO., LTD., Shanghai (CN)

(72) Inventor: Longtao Gao, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 164 days.

(21) Appl. No.: 17/125,017

(22) Filed: Dec. 17, 2020

(65) Prior Publication Data
US 2022/0075873 A1    Mar. 10, 2022

(30) Foreign Application Priority Data

Sep. 8, 2020   (CN) .......................... 202010934468.3

(51) Int. Cl.
*H04L 29/06* (2006.01)
*G06F 21/57* (2013.01)
*G06F 21/60* (2013.01)
*H04L 9/30* (2006.01)
*H04L 9/32* (2006.01)

(52) U.S. Cl.
CPC .......... *G06F 21/572* (2013.01); *G06F 21/602* (2013.01); *H04L 9/30* (2013.01); *H04L 9/3247* (2013.01)

(58) Field of Classification Search
CPC ...... G06F 21/572; G06F 21/602; G06F 21/64; G06F 21/44; H04L 9/30; H04L 9/3247; H04L 2209/26; H04L 9/0894; H04L 9/3066; H04L 9/3226
See application file for complete search history.

(56) References Cited

U.S. PATENT DOCUMENTS

| | | | |
|---|---|---|---|
| 2010/0174848 A1* | 7/2010 | Hana ....................... | G06F 21/57 711/216 |
| 2016/0028728 A1* | 1/2016 | Hampel ................ | H04L 9/3234 713/181 |
| 2019/0140852 A1* | 5/2019 | Kreft ...................... | G06F 21/335 |
| 2019/0297065 A1* | 9/2019 | Kanungo .............. | H04L 9/0891 |

* cited by examiner

*Primary Examiner* — Joseph P Hirl
*Assistant Examiner* — Leynna Truvan
(74) *Attorney, Agent, or Firm* — WOMBLE BOND DICKINSON (US) LLP

(57) ABSTRACT

The present disclosure relates to a firmware security verification method and device, including a processor and a read-only memory for storing instructions executable by the processor. While executing the instructions, the processor implements the following steps: acquiring firmware data and a digital signature; verifying the digital signature with a pre-stored public key; and running the firmware data upon determining that the digital signature passes the verification. With the firmware security verification method and device provided in embodiments of the present disclosure, the security of the firmware data can be acquired before the running of firmware.

15 Claims, 3 Drawing Sheets

FIRMWARE SECURITY VERIFICATION METHOD AND DEVICE

This application claims the priority of Chinese Patent Application No. 202010934468.3, filed Sep. 8, 2020, which is incorporated by reference herein by its entirety.

TECHNICAL FIELD

This disclosure relates to the technical field of data storage, particularly to a firmware security verification method and device.

BACKGROUND

Firmware refers to drivers stored inside an apparatus; through firmware, the operating system of the apparatus can implement operational actions of a specific machine by following standard apparatus drivers. For example, internal firmware may be found in CD-ROM drives and solid state drives. In early times, it is generally not necessary to upgrade the firmware and therefore early firmware chips were typically of a ROM design, in which firmware codes are fixed in production and cannot be modified by any means; even though severe bugs are found in firmware, the old firmware chips from the apparatus are replaced with new programmed ones by professionals. With continuous development of technology, it has become an urgent need for users to modify the firmware to adapt to the constantly updated hardware environment. Therefore, the rewritable EPROMs (Erasable Programmable ROMs), EEPROMs and Flashes enable repeatable writings on the chips, so as to modify and upgrade the firmware.

The importance of firmware in an apparatus relates to the security of firmware. If the firmware is modified or replaced maliciously, great threats would be brought about to user data. In a related art, after receiving new firmware, the apparatus can perform a CRC check on the firmware and compare the calculated check result against the received CRC check result. If the comparison fails, the firmware will be rejected for running. However, the above check method can only address the problems like data missing or loss during the transfer of firmware. If a malicious third party modifies both the firmware and the CRC check result, the apparatus might not be able to identify the fact that the newly input firmware has been tampered maliciously.

Accordingly, there is an urgent need in the related art for an approach to verify firmware security in an apparatus.

SUMMARY

The objective of embodiments of the present disclosure is to provide a firmware security verification device that can guarantee the security of running firmware data.

The firmware security verification device provided in the embodiments of the present disclosure is realized as follows.

A firmware security verification device comprises a processor and a read-only memory for storing processor executable instructions, wherein the processor is configured to execute the instructions to:

acquire firmware data and a digital signature;

verify the digital signature with a pre-stored public key; and in the case of determining that the digital signature passes the verification, run the firmware data.

Optionally, in an embodiment of the present disclosure, the device further comprises a one-time programmable memory, the one-time programmable memory is configured to store the public key.

Optionally, in an embodiment of the present disclosure, the one-time programmable memory is further configured to store processor executable instructions, the processor is configured to execute the instructions to:

in the case of monitoring that the processor receives a power supply or receives new firmware data, start execution of the instructions stored in the read-only memory.

Optionally, in an embodiment of the present disclosure, acquiring the firmware data and the digital signature for public key by the processor includes:

reading the firmware data and the digital signature from a programmable read-only memory, wherein the programmable read-only memory is electrically connected to the processor.

Optionally, in an embodiment of the present disclosure, verifying the digital signature for public key by the processor with the pre-stored public key includes:

acquiring the public key used for verifying the digital signature;

in the case of determining that the public key used for verifying the digital signature matches the pre-stored public key, determining a digital signature to be verified according to the firmware data and the public key; and in the case of determining that the digital signature to be verified matches the digital signature, determining that the digital signature passes the verification.

Optionally, in an embodiment of the present disclosure, verifying the digital signature by the processor with the pre-stored public key includes:

determining an encryption algorithm used to generate the digital signature;

performing a self-test on the encryption algorithm; and in the case of determining that a result from the self-test is correct, verifying the digital signature with the pre-stored public key.

Optionally, in an embodiment of the present disclosure, before acquiring the firmware data and the digital signature, the processor is further configured to:

turning off physical interfaces with debug functions on the processor.

Optionally, in an embodiment of the present disclosure, the firmware data includes data for a new firmware or upgrading data for an original firmware.

A firmware security verification method comprises:

acquiring firmware data and a digital signature;

verifying the digital signature with a pre-stored public key; and in the case of determining that the digital signature passes the verification, running the firmware data.

Optionally, in an embodiment of the present disclosure, acquiring the firmware data and the digital signature for public key includes:

reading the firmware data and the digital signature from a programmable read-only memory.

Optionally, in an embodiment of the present disclosure, verifying the digital signature for public key with the pre-stored public key includes:

acquiring the public key used for verifying the digital signature;

in the case that the public key used for verifying the digital signature matches the pre-stored public key, determining a digital signature to be verified according to the firmware data and the public key; and in the case of determining that the digital signature to be verified matches the digital signature, determining that the digital signature passes the verification.

A firmware data encryption method used to generate the firmware data, the method comprises:

encrypting firmware data, public key and private key with an asymmetrical encryption algorithm to generate a digital signature; and sending the firmware data, the public key and the digital signature.

Optionally, in an embodiment of the present disclosure, encrypting the firmware data, the public key and the private key with the asymmetrical encryption algorithm to generate the digital signature includes:

encrypting the firmware data to generate encrypted firmware data;

encrypting a user identification, elliptic curve parameters and the public key to generate a first intermediate value;

encrypting the encrypted firmware data and the first intermediate value to generate a second intermediate value; and encrypting the second intermediate value and the private key to generate the digital signature.

A firmware data encryption device comprises a processor and a memory for storing processor executable instructions; while executing the instructions, the processor is configured to implement the firmware data encryption method.

A non-transient computer read-only storage medium, when instructions in the storage medium are executed by a processor, the instructions cause the processor to carry out the firmware security verification method or the firmware data encryption method.

An electronic apparatus comprises the firmware security verification device.

The firmware security verification method and device provided in the present disclosure may perform security verification on firmware data encrypted with an asymmetrical encryption algorithm, and run the firmware data upon determining that the firmware data passes the security verification. Encrypting the firmware data with an asymmetrical encryption algorithm may guarantee that the firmware data will not be maliciously modified by a third party during its transfer or storage. The third party can modify the firmware data only if it obtains the private key of the firmware data generator. However, it is difficult to obtain the private key. Accordingly, by performing the security verification on the firmware data before running it, the security of the firmware data may be further guaranteed.

BRIEF DESCRIPTION OF THE DRAWINGS

Accompanying drawings herein are incorporated in the description and constitute a part of the description, which illustrate embodiments according to the present disclosure and, along with the description, serve to explain principles of the present disclosure.

DETAILED DESCRIPTION

Exemplary embodiments will be described in detail herein, of which examples are represented in drawings. Unless otherwise stated, when the following description refers to the accompanying drawings, same numerals in different drawings denote same or similar elements. Implementations described in the following exemplary embodiments do not represent all implementations pursuant to the present disclosure. In contrast, they are only examples of devices and methods pursuant to some aspects of the present disclosure as described in detail in the claims.

Figure 1:
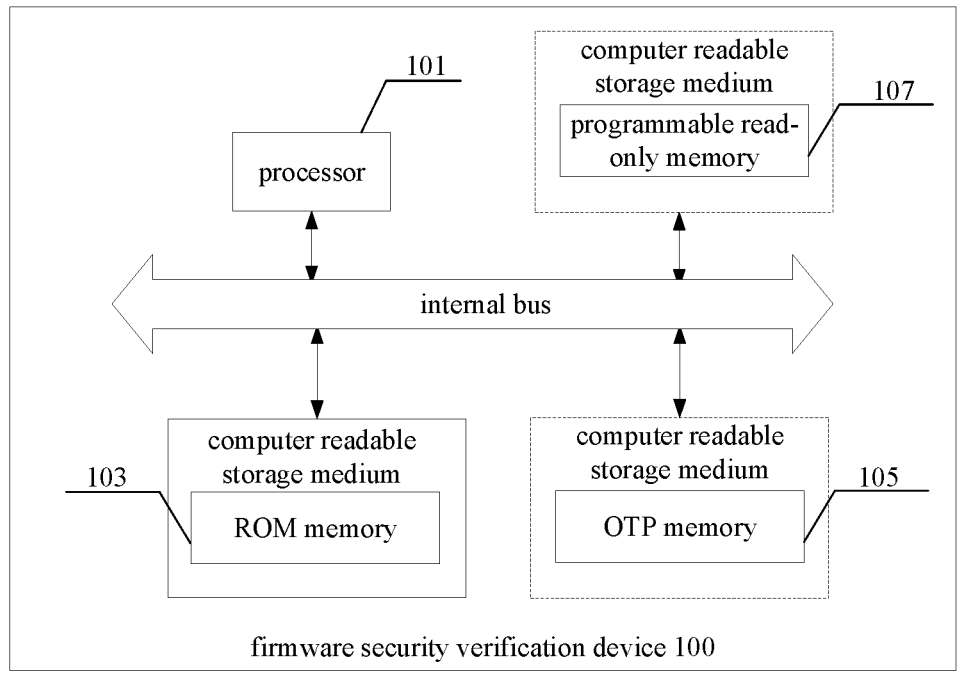
FIG. 1 is a schematic diagram showing the module structures of a firmware security verification device according to an exemplary embodiment.
Figure 2:
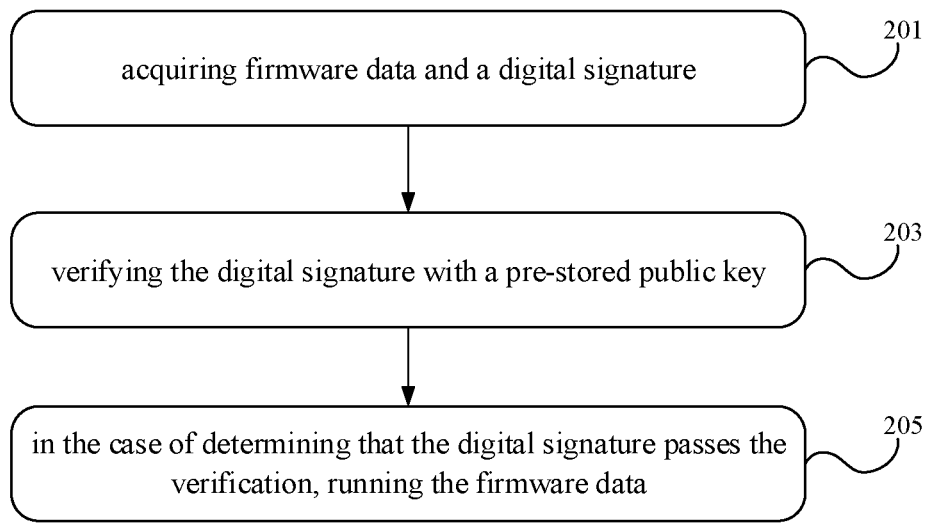
FIG. 2 shows steps implemented by a processor executing instructions according to an exemplary embodiment.

FIG. 1 illustrates a structural schematic diagram of an embodiment of the firmware security verification device provided by the present disclosure. As shown in FIG. 1, the firmware security verification device 100 may include a processor 101 and a read-only memory 103 for storing instructions executable by the processor 101. As shown in FIG. 2, when executing the instructions, the processor 101 implements the steps of:

S201: acquiring firmware data and a digital signature;

S203: verifying the digital signature with a pre-stored public key;

S205: in the case of determining that the digital signature passes the verification, running the firmware data.

In an embodiment of the present disclosure, the firmware security verification device 100 may be installed in any electronic apparatuses with firmware, including for example digital products such as cellphones, speakers, smart wearable devices, digital cameras, MP3s, MP4s, routers, e-books, switches, broadband modems, PSPs, PS3s, NDSs, XBOXs, flash disks, digital satellite receivers, as well as computer mainboards, printer BIOS, graphics card BIOS, mouse, monitors, CD-ROM drives, hard drives, keyboards, GPS terminals, sophisticated electronic instruments such as nuclear magnetic resonance instruments, etc.

The processor 101 may include controllers capable of executing instructions in the electronic apparatus and may be implemented in any suitable way using for example microprocessors, central processors (CPUs) and control logics in the memory controllers, which include, but not limited to, chips of the following models: ARC 625D, Atmel AT91SAM, Microchip PIC18F26K20 and Silicone Labs C8051F320. Within the processor 101, the executable instructions may be executed by hardware circuits such as logic gates, switches, Application Specific Integrated Circuits (ASICs), programmable logic controllers, and embedded microcontrollers.

In an embodiment of the present disclosure, as shown in FIG. 1, the computer storage media for storing instructions executable by the processor 101 may include the read-only memory 103, such as MASK ROM. Data in the read-only memory 103 has already been written in the production of chips and is fixed once written, and will not be lost even if power is cut off. In an embodiment of the present disclosure, the executable instructions in the read-only memory 103 are the first set of instructions to be executed by the processor 101 after starting to receive a power supply.

The processor 101 may first acquire firmware data and digital signature while executing the instructions. As shown in FIG. 1, the processor 101 may be electrically connected to a programmable read-only memory, which may include external storages of the electronic apparatus such as hard drives, floppy disks, CD-ROMs and flash disks. The firmware data is transferred from the apparatus operator to the electronic apparatus over network and may be downloaded to the programmable read-only memory regions of the electronic apparatus.

In embodiments of the present disclosure, the firmware data may be original data or encrypted data, which is not limited herein. The digital signature may also become a digital signature for public key that is a character string generated with an asymmetrical encryption algorithm and a digital digest algorithm, and may serve as effective proof for the authenticity of the firmware data transmitted by the information sender. In the asymmetrical encryption algorithm, a public key and a private key are required. The public key and the private key are a pair of keys, in which if data is encrypted with the public key, it can only be decrypted with a corresponding private key. The basic process of data transmission with the asymmetrical encryption algorithm is as follows: a first party generates a pair of keys and publishes the public key; if the first party needs to send firmware data to a second party, the first party may sign the firmware data with its own private key and then send the firmware data to the second party; then, the second party verifies the digital signature sent back from the first party with the public key of the first party. In embodiments of the present disclosure, the first party may include the apparatus operator, i.e., the party that develop or maintain the firmware data, and the corresponding second party may include the apparatus of the user. In some exemplary scenarios, an apparatus operator of a smart watch has recently developed a new function that enables the smart watch to automatically alert the user of an event; and the smart watch of the user may accomplish a firmware upgrade after receiving upgraded firmware data so as to acquire the above function. On such a basis, the apparatus operator of the smart watch may encrypt the upgraded firmware data with the private key to generate a digital signature and send it to individual smart watch terminals. Of course, in other embodiments, the firmware data may also include new firmware data to implement new functions in the apparatus; and the same electronic apparatus may include one or more firmware data, which is not limited in the present disclosure. It is to be noted that the asymmetrical encryption algorithm may include DH algorithm, RSA algorithm, DSA algorithm, elliptic curve (EC) algorithm, SM2 algorithm and variations thereof, which is not limited in the present disclosure.

In embodiments of the present disclosure, the firmware security verification device 100 may verify the digital signature with the pre-stored public key after receiving the firmware data and the digital signature. In order to guarantee the safety of the public key in the firmware security verification device 100, as shown in FIG. 1, the public key may be set in an OTP memory 105 of the firmware security verification device 100. The OTP memory 105, also known as a one-time programmable memory, is a static register that can only be written once, with its hardware circuitry guaranteeing that data written in the OTP memory 105 cannot be modified or lost. Storing the public key in the OTP memory 105 may prevent the public key in the apparatus from being modified by a malicious third party and hence guarantee its security. Furthermore, the OTP memory 105 may have one chance of programming after the chip is manufactured. Therefore, in the case that content to be written in the chip cannot be determined in the chip manufacturing process or the firmware security verification device 100 may be applied to many different types of apparatuses (different apparatus manufacturers may set different public keys) as a general-purpose device, data can be written into the chip flexibly after the chip is manufactured. In one embodiment of the present disclosure, the public key written into the OTP memory 105 may include the encrypted public key such as the Hash value of the original key. Of course, in other embodiments, in the case that the public key is determined before manufacturing the chip, the public key can be fixed in ROM in the production process of the chip, which may also prevent the public key from being modified by a malicious third party.

In practical application scenarios, a malicious third party may also prevent the processor 101 from executing the executable instructions stored in the read-only memory 103. On such a basis, it is possible to set a switch for turning on the processor 101 to start the execution of the executable instructions, and the switch is provided in the OTP memory 105. On such a basis, the OTP memory 105 may also store instructions executable by the processor 101; and while executing the instructions, the processor 101 is configured to:

in the case of monitoring that the processor 101 receives a power supply or receives new firmware data, start the execution of the instructions stored in the read-only memory 103.

As noted above, the firmware data may be stored in a programmable read-only memory. Due to the feature of being programmable of the programmable read-only memory, a malicious third party may write data into it and may also erase data, such as replacing firmware data in a flash disk. Therefore, the processor 101 can be set to start the execution of the instructions stored in the read-only memory 103 every time it receives the power supply, namely power-on. Of course, in the case that new firmware data, including new upgraded firmware data, is received, it is also necessary to execute the executable instructions stored in the read-only memory 103. By providing the switch for the processor 101 to start the execution of the executable instructions in the OTP memory 105, once the above-mentioned instruction is written, it is possible to guarantee that the flow of executing executable instructions stored in the read-only memory 103 by the processor 101 will not be shut down. Of course, the switch may also be fixed in ROM, which is not limited in the present disclosure.

In practical application scenarios, the processor is typically provided with physical interfaces with debug functions which are generally capable of receiving data from external and testing functions of processor. Therefore, these physical interfaces potentially become access for the malicious third party to interfere the execution of the executable instructions in the read-only memory 103 by the processor 101. On such a basis, prior to step S201, the processor 101 may further turn off physical interfaces with debug functions on the processor. In this way, it is possible to prevent a malicious third party from bypassing or influencing the security verification process by CPU JIAG, SPI ROM, uart, etc.

Figure 3:
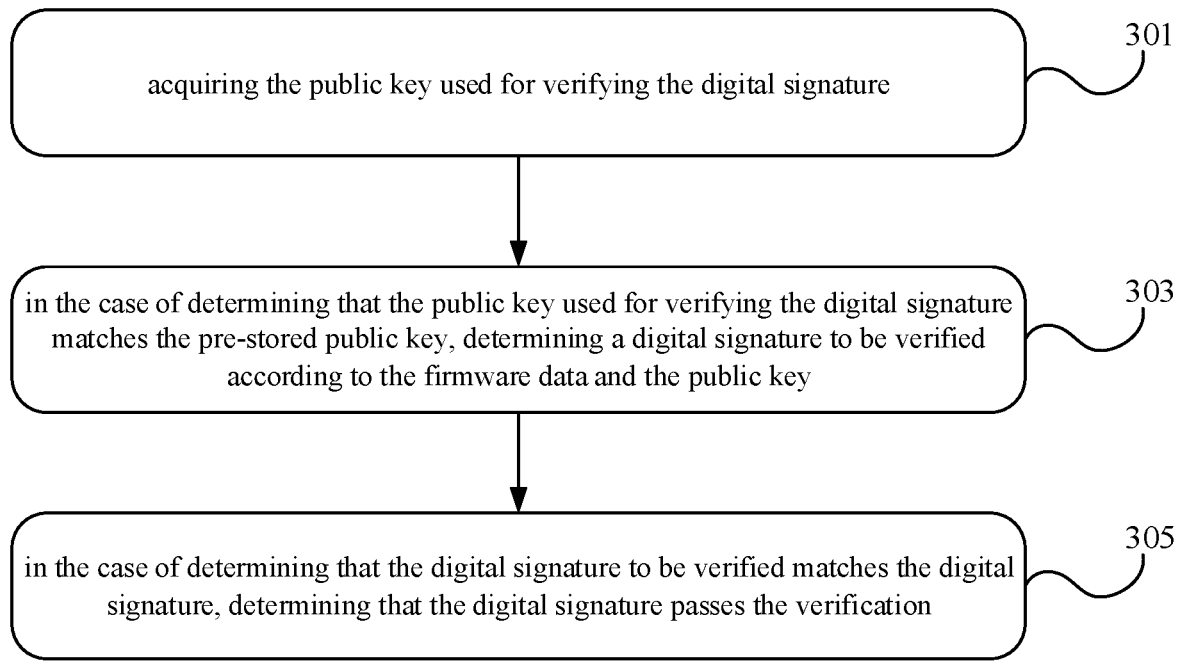
FIG. 3 shows steps implemented by a processor executing instructions according to an exemplary embodiment.

In an embodiment of the present disclosure, as shown in FIG. 3, verifying the digital signature for public key by the processor 101 with the pre-stored public key may include:

S301: acquiring the public key used for verifying the digital signature;

S303: in the case of determining that the public key used for verifying the digital signature matches the pre-stored public key, determining a digital signature to be verified according to the firmware data and the public key;

S305: in the case of determining that the digital signature to be verified matches the digital signature, determining that the digital signature passes the verification.

In an embodiment of the present disclosure, the firmware data sender may send not only the firmware data and the digital signature, but also the public key used for verifying the digital signature. In the case that the stored public key is an encrypted key, it is necessary to encrypt the public key used for verifying the digital signature with the same encryption algorithm. Then, it is possible to compare the public key sent by the firmware data sender to the pre-stored public key; and if the two public keys match, determine the digital signature to be verified according to the firmware data. Of course, if the two public keys do not match, the processor 101 may reject running the firmware data. In an embodiment, the digital signature to be verified may be generated in the way same as the digital signature in the firmware data. Of course, different asymmetrical encryption algorithms generate digital signatures in different ways, which is not limited herein. In the case of determining that the digital signature to be verified matches the digital signature in the firmware data, it is possible to determine that the digital signature passes the verification.

In one embodiment of the present disclosure, before verifying the digital signature, the used encryption algorithm can be self-tested. Specifically, it is possible to firstly determine the encryption algorithm used for security verification, for example, Hash algorithm SM3 cryptographic hash algorithm, asymmetrical encryption algorithm SM2, etc. Next, these encryption algorithms are subjected to self-test which determines that the result obtained by the processor 101 executing encryption algorithm is the same as expected. In the case of determining that the self-test result is correct, the digital signature is then verified. By the self-test on the encryption algorithm, the correctness of the encryption algorithm in the security verification process can be guaranteed.

The firmware security verification device provided in the present disclosure may perform security verification on the digital signature corresponding to the firmware data, and run the firmware data upon determining that the digital signature passes the security verification. Only if the digital signature passes the verification, can it be determined that the firmware data has not been maliciously modified by a third party during its transfer or storage. The third party can modify the firmware data only if it obtains the private key of the firmware data generator. However, it is difficult to obtain the private key. Accordingly, by verifying signature for firmware data before running the firmware data, the security of the firmware data may be further guaranteed.

Corresponding to the above-described firmware security verification device, another aspect of the present disclosure further provides a firmware security verification method, including:

acquiring firmware data and a digital signature;

verifying the digital signature with a pre-stored public key; and in the case of determining that the digital signature passes the verification, running the firmware data.

Optionally, in an embodiment of the present disclosure, acquiring the firmware data and the digital signature for public key includes:

reading the firmware data and the digital signature from a programmable read-only memory.

Optionally, in an embodiment of the present disclosure, verifying the digital signature for public key with the pre-stored public key includes:

acquiring the public key used for verifying the digital signature;

in the case that the public key used for verifying the digital signature matches the pre-stored public key, determining a digital signature to be verified according to the firmware data and the public key; and in the case of determining that the digital signature to be verified matches the digital signature, determining that the digital signature passes the verification.

The above-described embodiments may be referred to for specific implementations of the above-mentioned firmware security verification method, which will not be described repeatedly herein.

Figure 4:
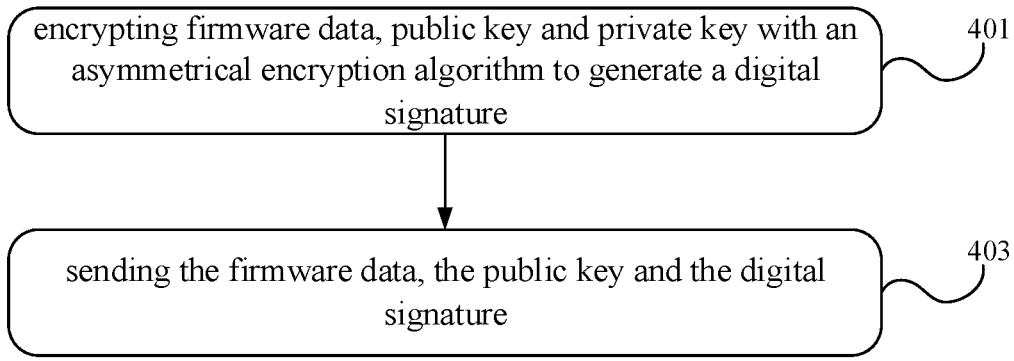
FIG. 4 is a flowchart of a firmware data encryption method according to an exemplary embodiment.

Another aspect of the present disclosure further provides a firmware data encryption method for generating the firmware data as described in any of the above-described embodiments. As shown in FIG. 4, the method may include:

S401: encrypting firmware data, public key and private key with an asymmetrical encryption algorithm to generate a digital signature;

S403: sending the firmware data, the public key and the digital signature.

In an embodiment of the present disclosure, by taking the elliptic curve algorithm or SM2 encryption algorithm as an example, encrypting the firmware data, the public key and the private key with the asymmetrical encryption algorithm to generate the digital signature includes:

encrypting the firmware data to generate encrypted firmware data;

encrypting a user identification, elliptic curve parameters and the public key to generate a first intermediate value;

encrypting the encrypted firmware data and the first intermediate value to generate a second intermediate value; and encrypting the second intermediate value and the private key to generate the digital signature.

Figure 5:
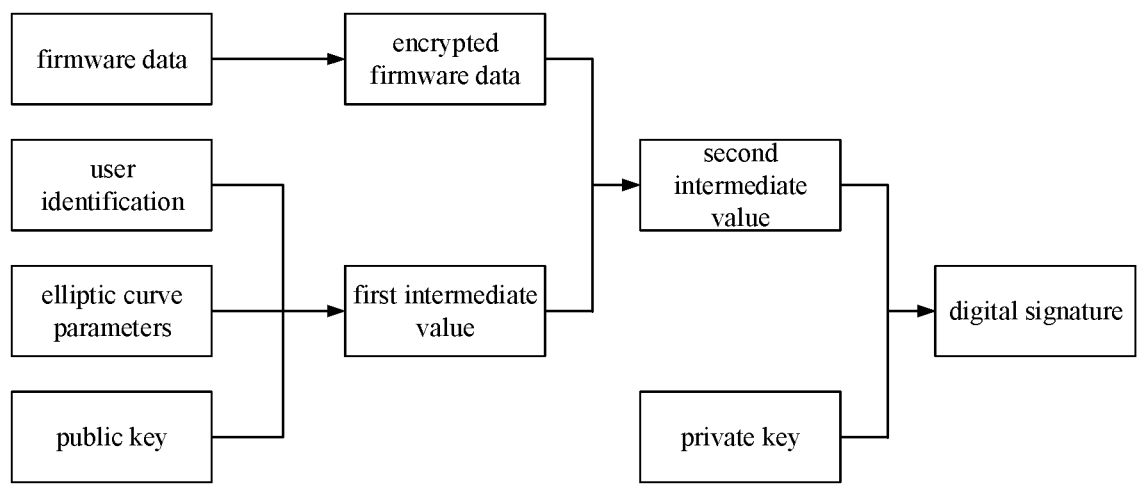
FIG. 5 is a diagram showing the relationship of generations among data during the asymmetrical encryption according to an exemplary embodiment.

FIG. 5 shows the relationship of generations among various data in the present embodiment, which will not be described any more herein.

Corresponding to the above-described firmware data encryption method, the present disclosure further provides a firmware data encryption device, including a processor and a memory for storing processor executable instructions. The processor may execute the instructions to implement the firmware data encryption algorithm according to any of the above-described embodiments.

Another aspect of the present disclosure further provides a non-transient computer read-only storage medium having computer instructions stored thereon, while being executed, the instructions implement the firmware security verification method or firmware data encryption method as described in any of the above embodiments.

The computer read-only storage medium may include a physical device for storing information which is typically digitized first and then stored with media utilizing electrical, magnetic or optical means. Data has been already written into the computer read-only storage medium as described in the present embodiment in the production process and is fixed once written and will not be lost even if power is cut off. The computer read-only storage medium may include ROM etc. and may of course also include devices storing information in a read-only way using magnetic energy or optically, which is not limited in the present disclosure. Of course, there are other forms of readable memory media such as quantum memory and graphene memory.

Another aspect of the present disclosure further provides an electronic apparatus including the firmware security verification device described in any of the above embodiments. The electronic apparatuses may include any apparatuses with firmware, including for example digital products such as cellphones, speakers, smart wearable devices, digital cameras, MP3s, MP4s, routers, e-books, switches, broadband modems, PSPs, PS3s, NDSs, XBOXs, flash disks, digital satellite receivers, and also computer mainboards, printer BIOS, graphic card BIOS, mice, monitors, CD-ROM drives, hard drives, keyboards, GPS terminals, sophisticated electronic instruments such as nuclear magnetic resonance instruments, etc.

Embodiments in the specification are all described in a progressive manner. Refer to embodiments mutually for same or similar parts thereof. Each embodiment focuses on the difference from other embodiments. In particular, for the system embodiments, they are described briefly since they are substantially similar to the method embodiments and the method embodiments may be referred to for relevant parts.

What have been described above are only embodiments of the present disclosure rather than limiting the present disclosure. For those skilled in the art, there are various modifications and changes to the present disclosure. Any modifications, equivalent substitutions and improvements made in the spirit and principle of the present disclosure are all should be encompassed in the scope of claims of the present disclosure.

The invention claimed is:

1. A firmware security verification device, comprising:
a processor, and
a read-only memory for storing processor executable instructions, which when executed by the processor, cause the processor to:
acquire firmware data and a digital signature generated by encrypting the firmware data, a public key and a private key including:
encrypting the firmware data to generate encrypted firmware data;
encrypting a user identification, elliptic curve parameters and the public key to generate a first intermediate value;
encrypting the encrypted firmware data and the first intermediate value to generate a second intermediate value; and
encrypting the second intermediate value and the private key to generate the digital signature;
verify the digital signature with a pre-stored public key set in a one-time programmable (OTP) memory; and
in the case of determining that the digital signature passes the verification, run the firmware data.

2. The firmware security verification device of claim 1, further comprising a one-time programmable memory, the one-time programmable memory is configured to store the public key.

3. The firmware security verification device of claim 2, wherein the one-time programmable memory is further configured to store processor executable instructions, the processor is configured to execute the instructions to:
in the case of monitoring that the processor receives a power supply or receives new firmware data, start execution of the instructions stored in the read-only memory.

4. The firmware security verification device of claim 1, wherein acquiring the firmware data and the digital signature for public key by the processor includes:
reading the firmware data and the digital signature from a programmable read-only memory, wherein the programmable read-only memory is electrically connected to the processor.

5. The firmware security verification device of claim 1, wherein verifying the digital signature for public key by the processor with the pre-stored public key includes:
acquiring the public key used for verifying the digital signature;
in the case of determining that the public key used for verifying the digital signature matches the pre-stored public key, determining a digital signature to be verified according to the firmware data and the public key; and
in the case of determining that the digital signature to be verified matches the digital signature, determining that the digital signature passes the verification.

6. The firmware security verification device of claim 1, wherein verifying the digital signature by the processor with the pre-stored public key includes:
determining an encryption algorithm used to generate the digital signature;
performing a self-test on the encryption algorithm; and
in the case of determining that a result from the self-test is correct, verifying the digital signature with the pre-stored public key.

7. The firmware security verification device of claim 1, wherein before acquiring the firmware data and the digital signature, the processor is further configured to:
turn off physical interfaces with debug functions on the processor.

8. The firmware security verification device of claim 1, wherein the firmware data includes data for a new firmware or upgrading data for an original firmware.

9. An electronic apparatus, comprising the firmware security verification device of claim 1.

10. A firmware security verification method, comprising:
acquiring firmware data and a digital signature generated by encrypting the firmware data, a public key and a private key including:
encrypting the firmware data to generate encrypted firmware data;
encrypting a user identification, elliptic curve parameters and the public key to generate a first intermediate value;
encrypting the encrypted firmware data and the first intermediate value to generate a second intermediate value; and
encrypting the second intermediate value and the private key to generate the digital signature;
verifying the digital signature with a pre-stored public key set in a one-time programmable (OTP) memory; and
in the case of determining that the digital signature passes the verification, running the firmware data.

11. The firmware security verification method of claim 10, wherein acquiring the firmware data and the digital signature for public key includes:
reading the firmware data and the digital signature from a programmable read-only memory.

12. The firmware security verification method of claim 10, wherein verifying the digital signature for public key with the pre-stored public key includes:
acquiring the public key used for verifying the digital signature;
in the case that the public key used for verifying the digital signature matches the pre-stored public key, determining a digital signature to be verified according to the firmware data and the public key; and in the case of determining that the digital signature to be verified matches the digital signature, determining that the digital signature passes the verification.

13. A non-transient computer read-only storage medium, when instructions in the storage medium are executed by a processor, the instructions cause the processor to perform the method of claim 10.

14. A firmware data encryption method, comprising:
encrypting firmware data, a public key and a private key with an asymmetrical encryption algorithm to generate a digital signature including:
  encrypting the firmware data to generate encrypted firmware data;
  encrypting a user identification, elliptic curve parameters and the public key to generate a first intermediate value;
  encrypting the encrypted firmware data and the first intermediate value to generate a second intermediate value; and
  encrypting the second intermediate value and the private key to generate the digital signature; and
sending the firmware data, the public key, and the digital signature to be verified with a pre-stored public key set in a one-time programmable (OTP) memory.

15. A firmware data encryption device, comprising:
a processor and a memory for storing processor executable instructions, while executing the instructions, the processor is configured to perform the method of claim 14.

* * * * *